United States Patent
Matsuo et al.

(10) Patent No.: US 7,221,622 B2
(45) Date of Patent: May 22, 2007

(54) SPEAKER DISTANCE DETECTION APPARATUS USING MICROPHONE ARRAY AND SPEECH INPUT/OUTPUT APPARATUS

(75) Inventors: Naoshi Matsuo, Kawasaki (JP); Hitoshi Iwamida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 10/740,569

(22) Filed: Dec. 22, 2003

(65) Prior Publication Data

US 2004/0141418 A1 Jul. 22, 2004

(30) Foreign Application Priority Data

Jan. 22, 2003 (JP) .............................. 2003-014000

(51) Int. Cl.
*G01S 3/80* (2006.01)
(52) U.S. Cl. ...................................... 367/125; 367/124
(58) Field of Classification Search ................ 367/124, 367/125, 127, 99, 100, 129; 381/92
See application file for complete search history.

(56) References Cited

U.S. PATENT DOCUMENTS

| | | | | |
|---|---|---|---|---|
| 5,208,864 A | * | 5/1993 | Kaneda | ........................ 381/92 |
| 6,243,322 B1 | * | 6/2001 | Zakarauskas | ................ 367/124 |
| 6,317,501 B1 | * | 11/2001 | Matsuo | ......................... 381/92 |
| 2002/0086656 A1 | * | 7/2002 | Mattisson | .................... 455/355 |
| 2003/0044025 A1 | * | 3/2003 | Ouyang et al. | ................ 381/92 |

FOREIGN PATENT DOCUMENTS

| | | |
|---|---|---|
| JP | 6-124097 | 5/1994 |
| JP | 9-162772 | 6/1997 |
| JP | 2002-111801 | 4/2002 |

* cited by examiner

*Primary Examiner*—Ian J. Lobo
(74) *Attorney, Agent, or Firm*—Staas & Halsey LLP

(57) ABSTRACT

There are provided a speaker distance detection apparatus and method using a microphone array, capable of exactly detecting the distance between a speaker and even a small terminal such as a mobile telephone, and a speech input/output apparatus using the method. The speaker distance detection apparatus uses a microphone array composed of a plurality of microphones, previously determines a reference microphone to be a reference among a plurality of microphones, detects differences between a signal level of the reference microphone and signal levels of the other microphones, based on correlations between signals in the respective microphones, and determines the distance from the microphone array to the speaker based on the detected signal level difference.

19 Claims, 6 Drawing Sheets

SPEAKER DISTANCE DETECTION APPARATUS USING MICROPHONE ARRAY AND SPEECH INPUT/OUTPUT APPARATUS

BACKGROUND OF THE INVENTION

1. Field of the Invention

The present invention relates to a speaker distance detection apparatus and method capable of detecting at which distance a speaker is uttering a speech by using a microphone array, and a speech input/output apparatus using the speaker distance detection apparatus.

2. Description of the Related Art

With the recent rapid advancement of a computer technique, mobile telephones, portable terminals, and the like as communication equipment are being enhanced in function or decreased in size. In particular, even various kinds of applications using a speech, which used to be difficult to be put into practical use in terms of a computer processing load, are shifting from a commercialization stage to a stage requesting convenience.

Recently, a speech input/output apparatus is also being put into practical use, which is capable of detecting an utterance direction of a speaker who utters a speech by using a plurality of microphones to enhance directivity, thereby making it difficult to pick up environmental noise.

However, particularly, in a mobile telephone, and the like, the recognition precision with respect to a speech input is often influenced by environmental noise. Therefore, in order to enhance the recognition precision, there is no effective way other than inputting a speech with a handset placed close to a face.

Recently, a technique has been developed, in which the distance between a speaker and a mobile telephone is detected by providing an infrared sensor, etc. at the mobile telephone, and estimating the level of recognition precision in accordance with the distance, thereby changing recognition engines, and changing methods for outputting recognition results. Such a technique is disclosed in JP 6(1994)-124097 A, JP 9(1997)-162772 A, JP 2002-111801 A, and the like.

However, the above-mentioned method has the following problems. First, even in the case of detecting the distance between a speaker and a mobile telephone, and using a recognition engine in accordance with the detected distance, in actual, a recognition mode is often switched manually. Therefore, when a speaker utters a speech while frequently placing a handset close to or away from a face, the switching operation itself is cumbersome.

Furthermore, even in the case where a recognition engine is switched automatically, when a speaker utters a speech while frequently placing a handset close to or away from a face, a time difference is necessarily caused between the actual state and the switching of the recognition engine. Consequently, the use mode of the mobile telephone is not matched with the recognition mode, and a speech input/output level becomes inappropriate, which makes it impossible to ensure desired recognition precision.

Furthermore, in order to detect the distance between the speaker and the mobile telephone, it is required to provide other sensor configurations such as an infrared sensor. However, there is a physical constraint on a mobile telephone that is strongly requested to be miniaturized, so that it is actually difficult to provide such a sensor configuration.

SUMMARY OF THE INVENTION

Therefore, with the foregoing in mind, it is an object of the present invention to provide a speaker distance detection apparatus and method using a microphone array capable of exactly detecting the distance between a speaker and even a small terminal such as a mobile telephone, and a speech input/output apparatus using the method.

In order to achieve the above-mentioned object, a speaker distance detection apparatus according to the present invention uses a microphone array including a plurality of microphones. The apparatus includes: a signal level difference detecting part for detecting differences between a signal level of a previously determined reference microphone among the plurality of microphones and signal levels of one or a plurality of other microphones based on correlations between signals in the respective microphones; and a speaker distance calculating part for obtaining a distance from the microphone array to a speaker based on the detected signal level difference.

According to the above-mentioned configuration, the distance from the microphone array to the speaker can be obtained by using the inputs to the microphones, and the distance from the microphone array to the speaker can be calculated exactly even in the case where the speaker utters a speech while frequently placing a handset dose to or away from a face, without providing an additional sensor.

Furthermore, in the speaker distance detection apparatus using a microphone array according to the present invention, it is preferable that, in the signal level difference detecting part, the differences between the signal level of the reference microphone and the signal levels of one or a plurality of other microphones are detected, using a time difference for a speech uttered by the speaker to reach the plurality of microphones.

Furthermore, a program product according to the present invention is characterized by software for executing the function of the above-mentioned speaker distance detection apparatus using a microphone array as processing steps of a computer. More specifically, a computer program product according to the present invention stores a computer-executable program for embodying a speaker distance detection method using a microphone array including a plurality of microphones in a recording medium. The computer program product includes: previously determining a reference microphone to be a reference among the plurality of microphones and detecting differences between a signal level of the reference microphone and signal levels of one or a plurality of other microphones based on correlations between signals in the respective microphones; and obtaining a distance from the microphone array to a speaker based on the detected signal level difference.

By loading the program onto a computer, a speaker distance detection apparatus using a microphone array can be realized, capable of obtaining the distance from the microphone array to a speaker using the inputs to the microphones, and exactly calculating the distance from the microphone array to the speaker even in the case where the speaker utters a speech while frequently placing a handset close to or away from a face.

Furthermore, in order to achieve the above-mentioned object, a speech input/output apparatus according to the present invention includes a microphone array and the speaker distance detection apparatus according to the present invention. Consequently, the effect similar to that of the speaker distance detection apparatus according to the present invention can be obtained.

It is preferable that the speech input/output apparatus according to the present invention further includes a control determining part for controlling speech processing in accordance with the distance from the microphone array to the speaker obtained by the speaker distance calculating part.

More specifically, it is also preferable that the control determining part controls directivity of the microphone array in accordance with the distance from the microphone array to the speaker obtained by the speaker distance calculating part.

Alternatively, it is also preferable that the control determining part controls a gain of an amplifier for amplifying a speech signal input through the microphone array in accordance with the distance from the microphone array to the speaker obtained by the speaker distance calculating part.

Alternatively, it is also preferable that the control determining part controls frequency characteristics of a speech signal input through the microphone array in accordance with the distance from the microphone array to the speaker obtained by the speaker distance calculating part.

Alternatively, it is also preferable that the speech input/output apparatus according to the present invention further includes an echo canceller or a noise canceller, wherein the control determining part controls characteristics of the echo canceller or the noise canceller in accordance with the distance from the microphone array to the speaker obtained by the speaker distance calculating part.

Furthermore, it is also preferable that the speech input/output apparatus according to the present invention further includes a speech recognition processing part, wherein the control determining part switches an acoustic model used in the speech recognition processing part in accordance with the distance from the microphone array to the speaker obtained by the speaker distance calculating part.

Alternatively, it is also preferable that the speech input/output apparatus according to the present invention further includes a speech recognition processing part, wherein the control determining part switches recognition vocabulary used in the speech recognition processing part in accordance with the distance from the microphone array to the speaker obtained by the speaker distance calculating part.

Furthermore, it is also preferable that the speech input/output apparatus according to the present invention further includes a control determining part for controlling an interface with respect to the speaker in accordance with the distance from the microphone array to the speaker obtained by the speaker distance calculating part.

More specifically, it is also preferable that the speech input/output apparatus according to the present invention further includes a loudspeaker for outputting a speech with respect to the speaker, wherein the loudspeaker includes at least two kinds, a handset loudspeaker and a loudspeaker for outputting a speech loudly, and the control determining part determines a loudspeaker for outputting a speech among the loudspeakers in accordance with the distance from the microphone array to the speaker obtained by the speaker distance calculating part. In this aspect, it is also preferable that, in a case where a speech is output from the loudspeaker for outputting a speech loudly, the control determining part stops a speech output from the loudspeaker for outputting a speech loudly while the speaker is uttering a speech.

Furthermore, it is also preferable that the speech input/output apparatus according to the present invention further includes a display for displaying information with respect to the speaker, wherein the control determining part switches a display mode of the display in accordance with the distance from the microphone array to the speaker obtained by the speaker distance calculating part.

These and other advantages of the present invention will become apparent to those skilled in the art upon reading and understanding the following detailed description with reference to the accompanying figures.

DESCRIPTION OF THE PREFERRED EMBODIMENTS

Figure 1:
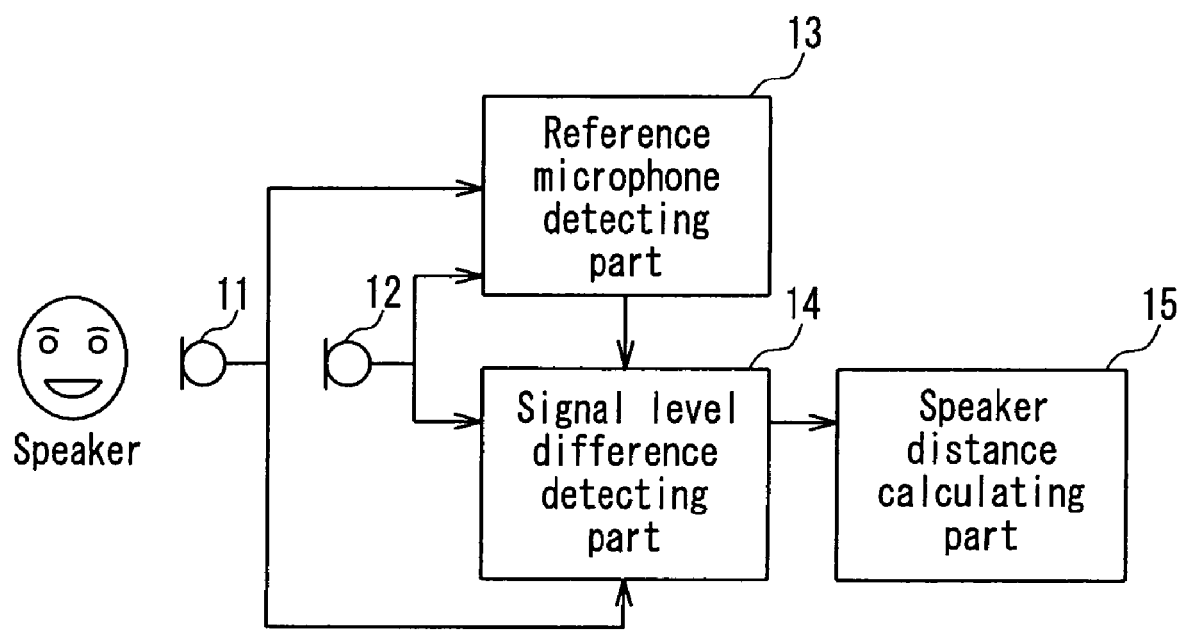
FIG. 1 is a block diagram showing a configuration of a speaker distance detection apparatus according to an embodiment of the present invention.

Hereinafter, a speaker distance detection apparatus using a microphone array according to an embodiment of the present invention will be described with reference to the drawings. FIG. 1 is a view showing a configuration of the speaker distance detection apparatus using a microphone array according to the embodiment of the present invention.

As shown in FIG. 1, in the speaker distance detection apparatus according to the present embodiment, a microphone array composed of two microphones 11 and 12 is provided as an input system. It should be appreciated that the number of the microphones is not limited to two, and a plurality of microphones equal to or more than two may be provided.

Among the plurality of microphones, a microphone to be a reference for detecting the difference in a signal level is previously determined. In the present embodiment, the microphone 11 placed closest to a speaker is determined to be a reference microphone. The reference microphone is not limited to the microphone 11 placed closest to the speaker, and for example, a microphone placed farthest from the speaker (microphone 12 in the present embodiment) may be determined as a reference microphone.

Furthermore, a reference microphone detecting part 13 may be provided so as to automatically detect a reference microphone in accordance with conditions. For example, the distance from a sound source to each microphone may be obtained based on the differences in level and reach time of input signals to the respective microphones, and a reference microphone may be determined based on the distance. In this case, as described above, a microphone placed closest to the sound source may be determined to be a reference microphone, or a microphone placed farthest from the sound source may be determined to be a reference microphone.

Furthermore, a signal level difference detecting part 14 detects differences between a signal level of the reference microphone detected by the reference microphone detecting part 13 and signal levels of one or a plurality of other microphones. The difference in a signal level refers to a level difference of a speech pressure, and is detected as a decibel value. In order to detect the difference in a signal level, first, a correlation between an input signal x1 of the microphone 11 and an input signal x2 of the microphone 12 constituting the microphone array is obtained, and a time difference for a speech signal uttered by a speaker to reach each microphone is calculated in accordance with Expression 1. As common denominators x1 and x2 of Expression 1, values shown in Expression 2 are used.

$$r(k) = \frac{\sum_{j=0}^{n-1} x1_{i-j} x2_{i-j+k}}{|x1||x2|} \quad (1)$$

$$|x1| = \sqrt{\left(\sum_{j=0}^{n-1} (x1_{i-j})^2\right)} \\ |x2| = \sqrt{\left(\sum_{j=0}^{n-1} (x2_{i-j+k})^2\right)} \quad (2)$$

In Expressions 1 and 2, i represents a sample number, j represents a sample number for correlated calculation, n represents a number of a computation of convolution for correlated calculation, and k represents the difference in a reaching time, respectively. In a positional relationship between the microphones 11 and 12 in FIG. 1 and the speaker who inputs a speech, k>0 is satisfied.

The value of k (k_max) in the case where r(k) calculated by Expression 1 is maximum represents a time difference for a speech to reach the microphones 11 and 12.

Next, the signal level difference between the input signals x1 and x2 of the microphones 11 and 12 is calculated, considering the difference in a reaching time k_max of a speech calculated by Expression 1. This level difference represents a distance from the microphone array to the speaker.

The signal level difference between the input signals x1 and x2 is calculated by Expression 3.

$$\text{diff\_g} = \frac{\sum_{j=0}^{n-1} x1_{i-j} x2_{i-j+k\_max}}{\sum_{j=0}^{n-1} (x1_{i-j})^2} \quad (3)$$

In Expression 3, the numerator represents a cross-correlation of input signals to microphones to be compared, and the denominator represents an autocorrelation of an input signal to a reference microphone. Thus, the influence of environmental noise other than a speech to be input to a microphone can be minimized.

In a positional relationship between the microphones 11, 12 and the speaker who inputs a speech in FIG. 1, the signal level difference diff_g calculated by Expression 3 is smaller as the distance between the microphone array and the speaker is shorter, and the signal level difference diff_g is larger as the distance is longer. This is ascribed to the fact that a speech signal uttered by the speaker propagates in a shape close to a spherical wave.

In a speaker distance calculating part 15, the distance from the microphone array to the speaker is obtained based on the signal level difference detected by the signal level difference detecting part 14. Thus, the distance from the microphone array to the speaker can be obtained without adding an external sensor or the like, so that various kinds of controls can be easily performed in accordance with the distance.

Figure 5A:
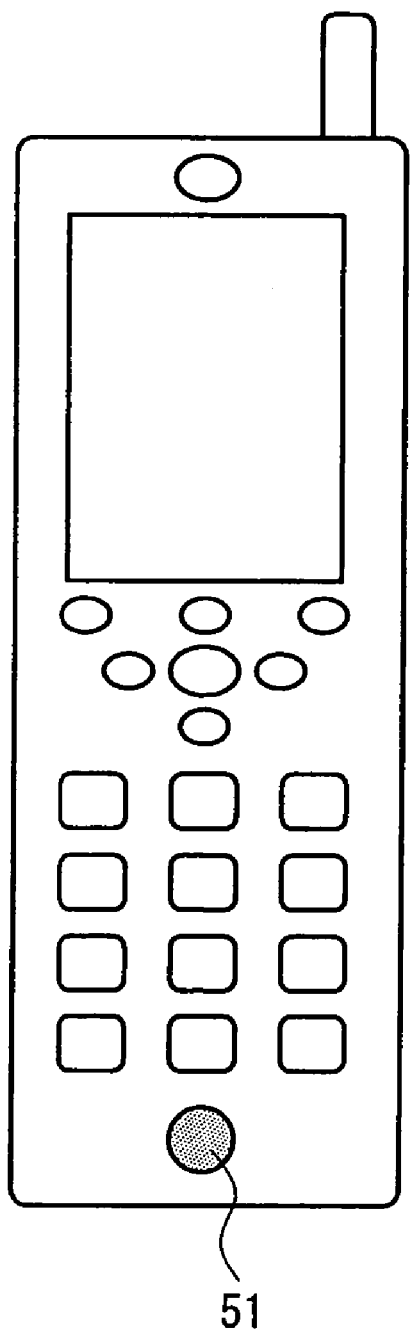
FIG. 5A is a plan view showing an outer appearance on a front side of a speech input/output apparatus according to one embodiment of the present invention.
Figure 5B:
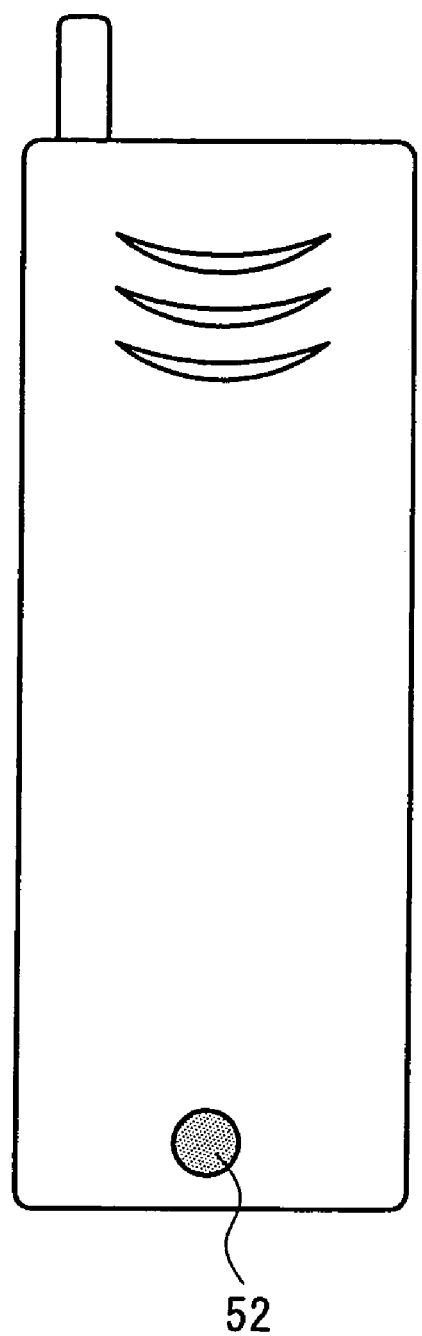
FIG. 5B is a plan view showing an outer appearance on a back side of the speech input/output apparatus.

The speaker distance detection apparatus according to the present embodiment is applicable to a speech input/output apparatus. Examples of the speech input/output apparatus according to the present invention include, but are not limited to, a mobile telephone, a handset of a stationary telephone, an interphone, a notebook personal computer, a PDA, and the like. For example, in the case where the speech input/output apparatus according to the present invention is embodied as a mobile telephone, as shown in FIG. 5A, one microphone 51 is provided on the front side of a body, and as shown in FIG. 5B, another microphone 52 is provided on the back side of the body. Either one of them may be set to be a reference microphone. The present invention is not limited to this example, and an appropriate number of microphones may be provided at positions suitable for obtaining the distance from the microphone array to the speaker in each speech input/output apparatus.

Figure 2:
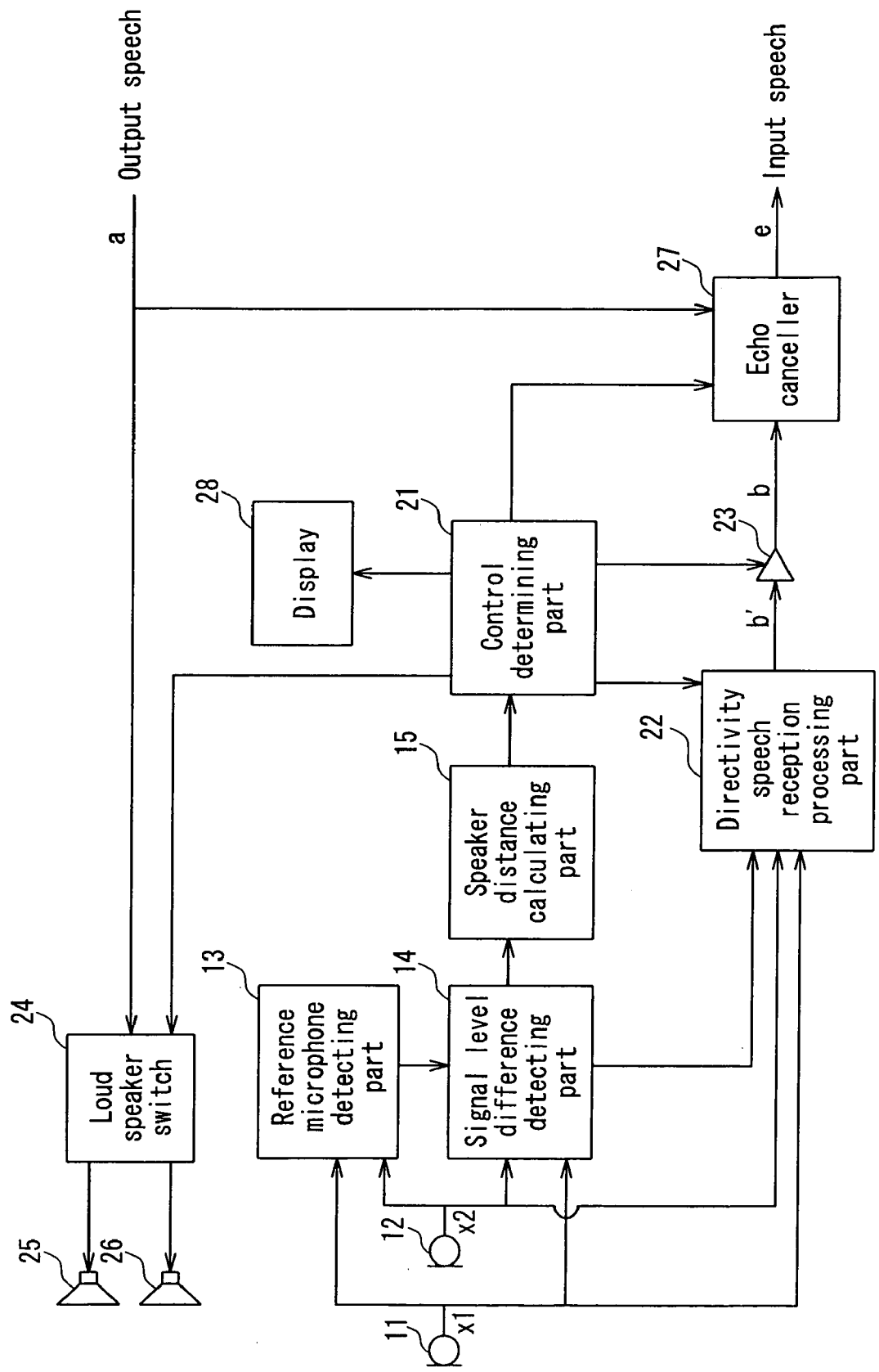
FIG. 2 is a block diagram showing a configuration of a speech input/output apparatus including the speaker distance detection apparatus according to the embodiment of the present invention.

For example, FIG. 2 shows an example of a speech input/output apparatus using the speaker distance detection apparatus according to the present embodiment. In FIG. 2, reference numeral 21 denotes a control determining part for controlling the following processing based on the distance calculated by the speaker distance calculating part 15.

More specifically, the signal level difference diff_g between the microphones constituting the microphone array calculated in the speaker distance calculating part 15 is compared with a previously set predetermined threshold value. In the case where the signal level difference diff_g is smaller than the threshold value, it is determined that the speaker is uttering a speech near the microphone array. In the case where the signal level difference diff_g is larger than the threshold value, it is determined that the speaker is uttering a speech away from the microphone array.

Then, for example, directivity speech reception processing for enhancing the directivity of the microphone array is performed based on the determination in the control determining part 21. In this case, in the directivity speech reception processing part 22, a synchronous subtraction between the input signals x1 and x2 of the microphones 11 and 12 is performed using a reaching time difference k_max of a speech signal calculated in the signal level difference detecting part 14 in accordance with the distance between the speaker and the microphone array, by Expression 4.

$$b' = x1_i - \alpha x2_{i-k\_max} \quad (4)$$

In Expression 4, the following is intended: subtraction is performed so that a zero point is formed in a direction opposite to the speaker, whereby strong directivity is generated in a direction of the speaker. A coefficient α is a value in a range of $0 \leq \alpha \leq 1$. The coefficient α is set to be smaller in the case where the distance between the microphone array and the speaker is shorter, and the coefficient α is set to be larger in the case where the distance therebetween is longer.

Regarding b' calculated by the directivity speech reception processing part 22, level control is preferably performed in accordance with the distance between the speaker and the microphone array. More specifically, in an amplifier 23, when the distance between the speaker and the microphone array is shorter, a gain b is set to be smaller. When the distance therebetween is longer, the gain (b/b') is set to be larger.

Furthermore, in the case where an equalizer is provided, it is preferable that frequency characteristics are also changed. More specifically, in the case where the distance between the speaker and the microphone array is long, a high pitched speech is difficult to pick up. Therefore, erroneous recognition and the like of a speech signal can be prevented by emphasizing a high frequency. Furthermore, when the equalizer is provided, an output speech signal can be caught exactly. The equalizer is placed at a position where a signal b' or b shown in FIG. 2 is controlled.

Alternatively, in the case where the speech input/output apparatus includes a plurality of kinds of loudspeakers, it is also considered that a loudspeaker is switched by a speaker switch 24. In the case where the distance between the speaker and the microphone array is short, the loudspeaker is switched to a handset loudspeaker 25. In the case where the distance is long, the loudspeaker is switched to a loudspeaker 26 for outputting a speech loudly. Thus, too large output speech or difficulty in catching a speech can be prevented.

Furthermore, for example, in an application providing information through a speech output, when bidirectional communication is performed using the loudspeaker 26 for outputting a speech loudly in the case where the distance between the speaker and the microphone array is long as described above, there is a high possibility that howling may occur. Thus, in order to prevent a howling phenomenon, a speech output from the loudspeaker 26 for outputting a speech loudly can be stopped during utterance of a speaker, as interruption processing.

Alternatively, it is also considered that an echo canceller 27 is controlled, whereby a speech output from the handset loudspeaker 25 or the loudspeaker 26 for outputting a speech loudly is suppressed from going around the microphone array. An input speech e via the echo canceller 27 is calculated by Expression 5.

$$e_i = b_i - \sum_{j=0}^{n'-1} h_j a_{i-j} \quad (5)$$

In Expression 5, h represents a coefficient of an FIR filter used in the echo canceller 27, and n' represents an order of the FIR filter, respectively. Furthermore, the filter coefficient h is updated using a learning identification method as represented by Expression 6. In Expression 6, β is generally a constant, and 0<β<1.

$$\left. \begin{array}{l} h_j = h_j + \beta e_i \dfrac{a_{i-j}}{|a|^2} \\ |a|^2 = \sum_{j=0}^{n'-1} (a_{i-j})^2 \end{array} \right\} \quad (6)$$

The order n' of the FIR filter in Expressions 5 and 6 is changed in accordance with the distance between the speaker and the microphone array. More specifically, in the case where the distance between the speaker and the microphone array is shorter, the order n' of the FIR filter is set to be smaller so as to reduce a processing computation amount. In the case where the distance is longer, the order n' of the FIR filter is set to be larger so as to obtain a sufficient suppression amount.

In the present embodiment, the echo canceller for suppressing a wraparound speech signal has been described. However, the present invention is not particularly limited to the apparatus having the echo canceller. For example, even with a noise canceller and the like for suppressing noise, the processing can be similarly controlled in accordance with the distance between the speaker and the microphone array.

Figure 6:
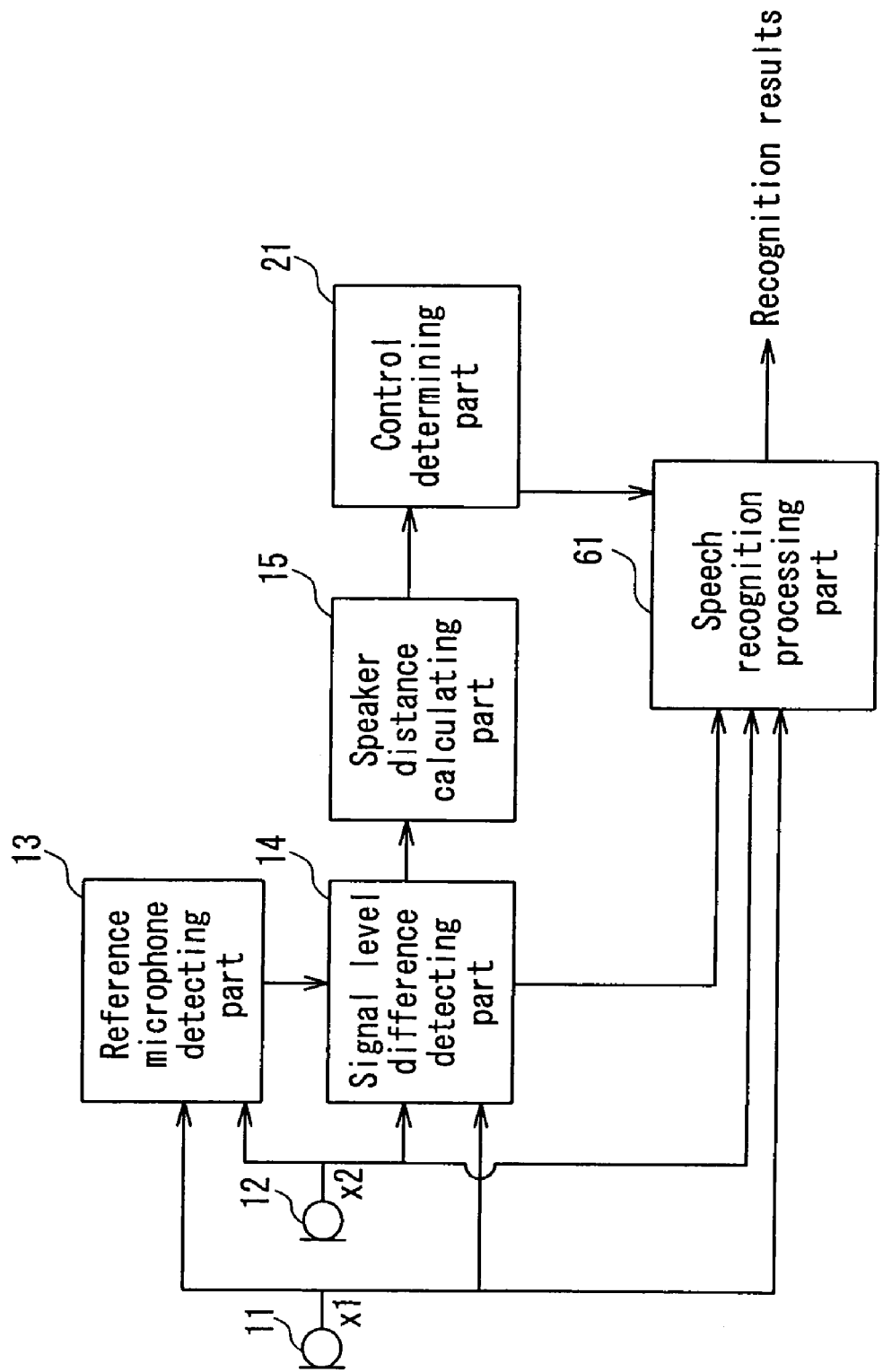
FIG. 6 is a block diagram showing a configuration of a speech input/output apparatus according to another embodiment of the present invention.

Furthermore, even in a speech recognition application, it is considered that an acoustic model suitable for the distance between the speaker and the microphone array is selected in order to obtain a high pitched speech recognition ratio. More specifically, as shown in FIG. 6, in a speech input/output apparatus provided with a speech recognition processing part 61 for performing speech recognition processing based on a speech input from the microphones 11, 12, an instruction is given from the control determining part 21 to the speech recognition processing part 61 in the following manner: in the case where the distance between the speaker and the microphone array is short, an acoustic model for a close speaker is used, and in the case where the distance is long, an acoustic model for a distant speaker is used, whereby an application with a higher recognition precision can be configured.

Furthermore, it is also considered that recognition vocabulary is changed depending upon the distance between the speaker and the microphone array. For example, in the speech input/output apparatus having a configuration shown in FIG. 6, in the case where the distance between the speaker and the microphone array is long, an instruction may be given from the control determining part 21 to the speech recognition processing part 61 so as to reduce the recognition vocabulary. In the case where the distance between the speaker and the microphone array is long, conventionally, a speech recognition ratio may be degraded, compared with the case where the distance is short. However, according to the configuration of the present embodiment, a speech recognition ratio can be prevented from being degraded.

In addition to the above example, in the case where the speech input/output apparatus is provided with a display device 28 as shown in FIG. 2, it is also considered that an image display is controlled in accordance with the distance between the speaker and the microphone array. For example, in the case where the distance between the speaker and the microphone array is short, the display 28 is controlled by the control determining part 21 so as to turn off an image display, a backlight, and the like. In FIG. 2, the exemplary configuration of the speech input/output apparatus having the display 28 is shown. However, the display 28 is not an indispensable constituent element.

Alternatively, it is also considered that transmission of information is controlled in accordance with the distance between the speaker and the microphone array. For example, in the case where the distance between the speaker and the microphone array is short, the following is also possible: packet transmission of image information and text information from a server, which transmits information, to a terminal at a speaker is stopped, and the like, whereby waste of packet transmission is reduced. The reason for this is as follows. In the case where a speaker is close to a microphone, the speaker uses a terminal like a handset, and may not watch a display. Thus, in this case, if packet transmission of image information and text information for a display is stopped, waste of transmission can be reduced.

Figure 3:
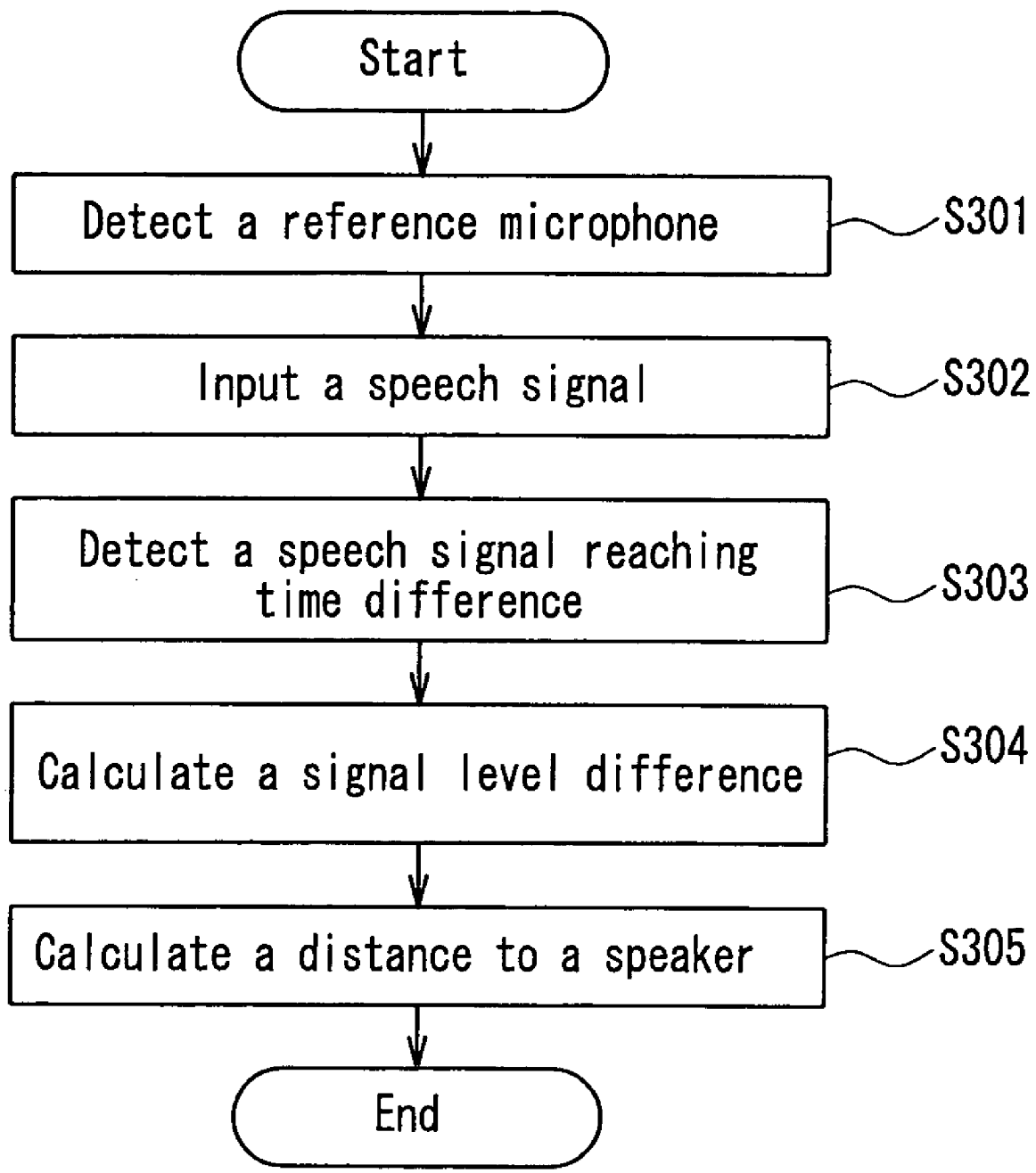
FIG. 3 is a flow chart illustrating processing in the speaker distance detection apparatus according to the embodiment of the present invention.

Next, a processing flow of a program for realizing the speaker distance detection apparatus according to the embodiment of the present invention will be described. FIG. 3 shows a flow chart illustrating the processing of the program for realizing the speaker distance detection apparatus according to the embodiment of the present invention.

First, one microphone to be a reference for detecting a signal level difference is detected among a plurality of microphones (Operation 301). Then, a speech signal uttered by a speaker is input through each microphone (Operation 302).

Then, a time difference for the speech signal uttered by the speaker to reach the reference microphone and the other microphones is calculated (Operation 303). Then, based on the reaching time difference, a signal level difference of input signals to the reference microphone and the other microphones is calculated (Operation 304). Finally, the distance from the microphone array to the speaker is obtained based on the signal level difference (Operation 305).

As described above, according to the present embodiment, the distance from the microphone array to the speaker can be obtained by using the inputs to the microphones, and the distance from the microphone array to the speaker can be calculated exactly without providing an additional sensor even in the case where a speaker utters a speech while frequently placing a handset close to or away from a face.

Figure 4:
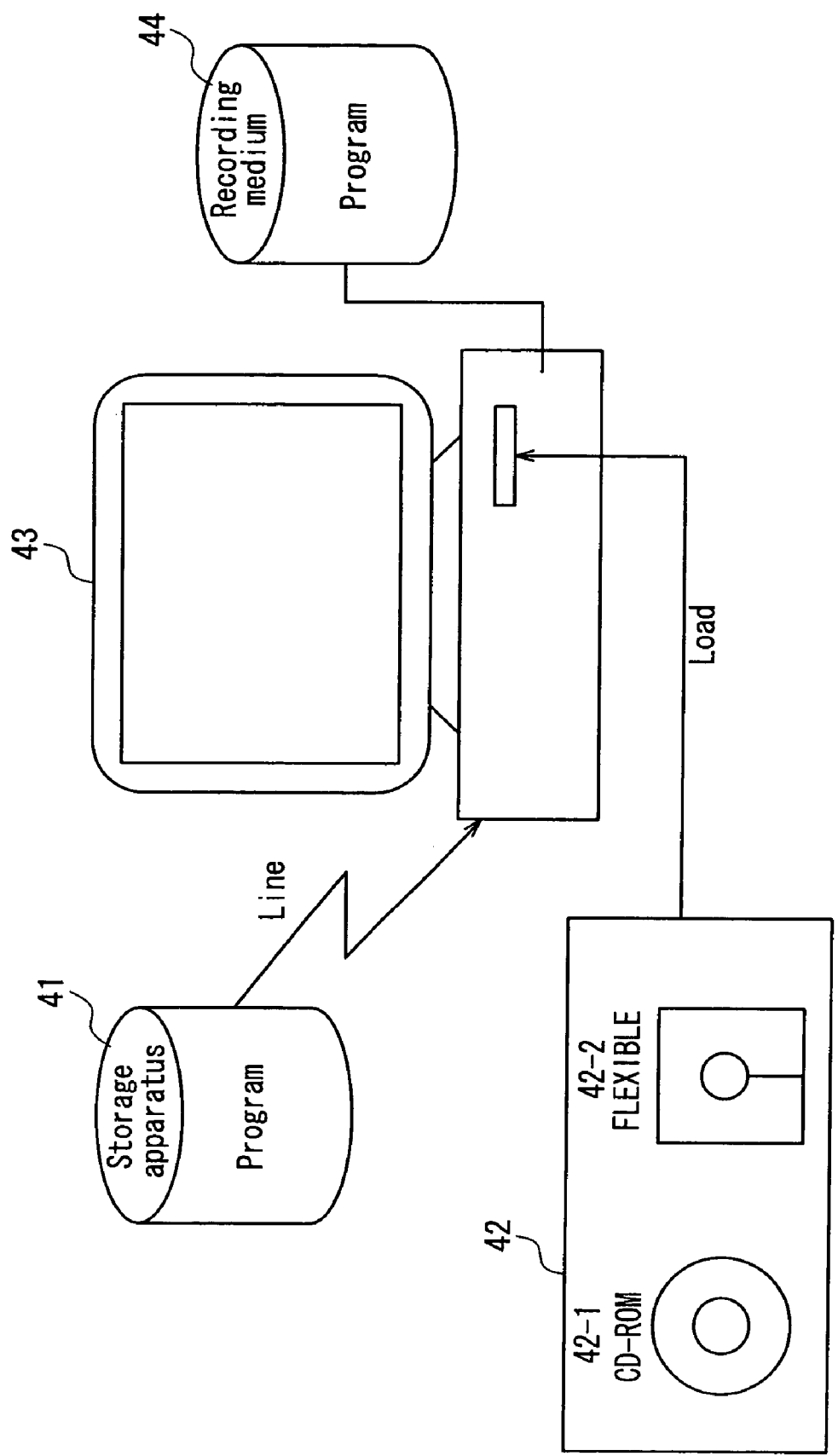
FIG. 4 illustrates a computer environment.

The program for realizing the speaker distance detection apparatus according to the present embodiment of the present invention may be stored in not only a portable recording medium 42 such as a CD-ROM 42-1 and a flexible disk 42-2, but also another storage apparatus 41 provided at the end of a communication line and a recording medium 44 such as a hard disk and a RAM of a computer 43, as shown in FIG. 4. During execution, the program is loaded for execution on a main memory.

Furthermore, in the case where the speech input/output apparatus according to the present invention is, for example, dedicated equipment such as a mobile telephone, an interphone, a handset of a stationary telephone, etc., a built-in processor for the dedicated equipment executes the program for realizing the speaker distance detection apparatus of the present invention. Furthermore, in the case where the speech input/output apparatus according to the present invention is, for example, a PDA and a notebook personal computer, a processor having relatively high versatility executes a program for realizing the speaker distance detection apparatus of the present invention.

As described above, in the speaker distance detection apparatus according to the present invention, the distance from the microphone array to the speaker can be obtained by using the inputs to the microphones, and the distance from the microphone array to the speaker can be calculated exactly even in the case where the speaker utters a speech while frequently placing a handset close to or away from a face, without providing an additional sensor.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speaker distance detection apparatus using a microphone array of a plurality of microphones, comprising:
   a sound pressure level difference detecting part detecting differences between a sound pressure level of a previously determined reference microphone, among the plurality of microphones, and respective sound pressure levels of one or a plurality of other microphones based on correlations between speech signals from a speaker reaching the respective microphones; and
   a speaker distance calculating part calculating a distance from the microphone array to the speaker based on the detected sound pressure level differences.

2. The speaker distance detection apparatus according to claim 1, wherein, in the sound pressure level difference detecting part, the differences between the sound pressure level of the reference microphone and the respective sound pressure levels of one or a plurality of microphones are detected, using a time difference for speech signals uttered by the speaker to reach the plurality of microphones.

3. A speech input/output apparatus, comprising a microphone array and the speaker distance detection apparatus of claim 1 using the microphone array.

4. The speech input/output apparatus according to claim 3, further comprising a control determining part controlling speech processing in accordance with the distance from the microphone array to the speaker obtained by the speaker distance calculating part.

5. The speech input/output apparatus according to claim 4, wherein the control determining part controls directivity of the microphone array in accordance with the distance from the microphone array to the speaker obtained by the speaker distance calculating part.

6. The speech input/output apparatus according to claim 4, wherein the control determining part controls a gain of an amplifier amplifying a speech signal input through the microphone array in accordance with the distance from the microphone array to the speaker, obtained by the speaker distance calculating part.

7. The speech input/output apparatus according to claim 4, wherein the control determining part controls frequency characteristics of a speech signal input through the microphone array in accordance with the distance from the microphone array to the speaker, obtained by the speaker distance calculating part.

8. The speech input/output apparatus according to claim 4, further comprising an echo canceller or a noise canceller, wherein the control determining part controls characteristics of the echo canceller or the noise canceller in accordance with the distance from the microphone array to the speaker, obtained by the speaker distance calculating part.

9. The speech input/output apparatus according to claim 4, further comprising a speech recognition processing part, wherein the control determining part switches an acoustic model used in the speech recognition processing part in accordance with the distance from the microphone array to the speaker, obtained by the speaker distance calculating part.

10. The speech input/output apparatus according to claim 4, further comprising a speech recognition processing part, wherein the control determining part switches recognition vocabulary, used in the speech recognition processing part, in accordance with the distance from the microphone array to the speaker obtained by the speaker distance calculating part.

11. The speech input/output apparatus according to claim 3, further comprising a control determining part for controlling an interface with respect to the speaker in accordance with the distance from the microphone array to the speaker, obtained by the speaker distance calculating part.

12. The speech input/output apparatus according to claim 11, further comprising a loudspeaker for outputting a speech with respect to the speaker, wherein the loudspeaker includes at least two kinds, a handset loudspeaker and a loudspeaker for outputting a speech loudly, and the control determining part determines a loudspeaker for outputting a speech, among the loudspeakers, in accordance with the distance from the microphone array to the speaker obtained by the speaker distance calculating part.

13. The speech input/output apparatus according to claim 12, wherein, in a case where a speech is output from the loudspeaker for outputting a speech loudly, the control determining part stops a speech output from the loudspeaker for outputting a speech loudly while the speaker is uttering a speech.

14. The speech input/output apparatus according to claim 11, further comprising a display for displaying information with respect to the speaker, wherein the control determining part switches a display mode of the display in accordance with the distance from the microphone array to the speaker obtained by the speaker distance calculating part.

15. The speaker distance detection apparatus according to claim 1, wherein the sound pressure level difference detecting part calculates the sound pressure level difference as a ratio between a cross-correlation of input signals to the reference microphone and the one or a plurality of other microphones, and an autocorrelation of an input signal to the reference microphone.

16. A speaker distance detection method using a microphone array including a plurality of microphones, comprising:

previously determining a reference microphone to be a reference among the plurality of microphones, and detecting differences between a sound pressure level of the reference microphone and respective sound pressure levels of one or a plurality of other microphones based on correlations between speech signals from a speaker reaching the respective microphones; and obtaining a distance from the microphone array to a speaker based on the detected sound pressure level differences.

17. The speaker distance detection method according to claim 16, wherein the sound pressure level difference is calculated as a ratio between a cross-correlation of input signals to the reference microphone and the one or a plurality of other microphones, and an autocorrelation of an input signal to the reference microphone.

18. A computer program stored in a media for reading by a computer and controlling the computer to execute the operations of:

previously determining a reference microphone to be a reference among the plurality of microphones and detecting differences between a sound pressure level of the reference microphone and sound pressure levels of one or a plurality of other microphones of the microphone array based on correlations between speech signals from a speaker reaching the respective microphones; and obtaining a distance from the microphone array to a speaker based on the detected sound pressure level differences.

19. The computer program stored in the media according to claim 18, wherein the sound pressure level difference is calculated as a ratio between a cross-correlation of input signals to the reference microphone and the one or a plurality of other microphones, and an autocorrelation of an input signal to the reference microphone.

* * * * *